(12) United States Patent
Schneider et al.

(10) Patent No.: US 7,294,783 B2
(45) Date of Patent: Nov. 13, 2007

(54) MOUNTING COMPONENT FOR A MOTOR VEHICLE AND METHOD FOR INSTALLING A VEHICLE ELECTRICAL SYSTEM FOR A MOTOR VEHICLE

(75) Inventors: Bernd Schneider, Dettelbach (DE); Thorsten Kuhnen, Kitzingen (DE); Stefan Schiebold, Schweinfurt (DE); Michael Gelshorn, Weyhe (DE); Winfried Scheibe, Lippstadt (DE)

(73) Assignee: Intedis GmbH & Co. KG, Wurzburg (DE)

( * ) Notice: Subject to any disclaimer, the term of this patent is extended or adjusted under 35 U.S.C. 154(b) by 113 days.

(21) Appl. No.: 10/530,400

(22) PCT Filed: Sep. 15, 2003

(86) PCT No.: PCT/DE03/03065

§ 371 (c)(1),
(2), (4) Date: Sep. 7, 2005

(87) PCT Pub. No.: WO2004/035354

PCT Pub. Date: Apr. 29, 2004

(65) Prior Publication Data

US 2006/0124369 A1    Jun. 15, 2006

(30) Foreign Application Priority Data

Oct. 11, 2002  (DE)  ............ 102 47 595

(51) Int. Cl.
H02G 3/04  (2006.01)
(52) U.S. Cl. .................. 174/72 A; 29/430
(58) Field of Classification Search .......... 439/34; 174/72 A; 269/146.7, 37.2; 29/469, 430
See application file for complete search history.

(56) References Cited

U.S. PATENT DOCUMENTS 4,750,265 A * 6/1988 Watanabe et al. ............. 29/854
4,815,984 A * 3/1989 Sugiyama et al. ............ 439/211

(Continued)

FOREIGN PATENT DOCUMENTS

DE     36 09 704 A1    3/1986

(Continued)

OTHER PUBLICATIONS

Derwent 2000-504404, Cable And Plug Transport Attachment For Use In Vehicle Body.*

*Primary Examiner*—Neil Abrams
(74) *Attorney, Agent, or Firm*—Reed Smith LLP; Stanley P. Fisher, Esq.; Juan Carlos A. Marquez, Esq.

(57) ABSTRACT

The mounting component (2) includes a module rack (4), on which components (6, 10) of a vehicle electrical system have been mounted beforehand, and is intended for installation in the motor vehicle (18) together with the previously mounted components (6, 10). At least one additional module of the vehicle electrical system (11) that extends beyond the spatial limit of the module rack (4) is connected by prior assembly with the components (6, 10) arranged on the module rack (4). The module rack (4) also serves as a self-contained transportation base for both the pre-assembled components (6, 10) and the additional electrical system module (11). This configuration enables a high degree of pre-assembly and thus also simplifies final assembly.

14 Claims, 3 Drawing Sheets

U.S. PATENT DOCUMENTS

Figure 1:
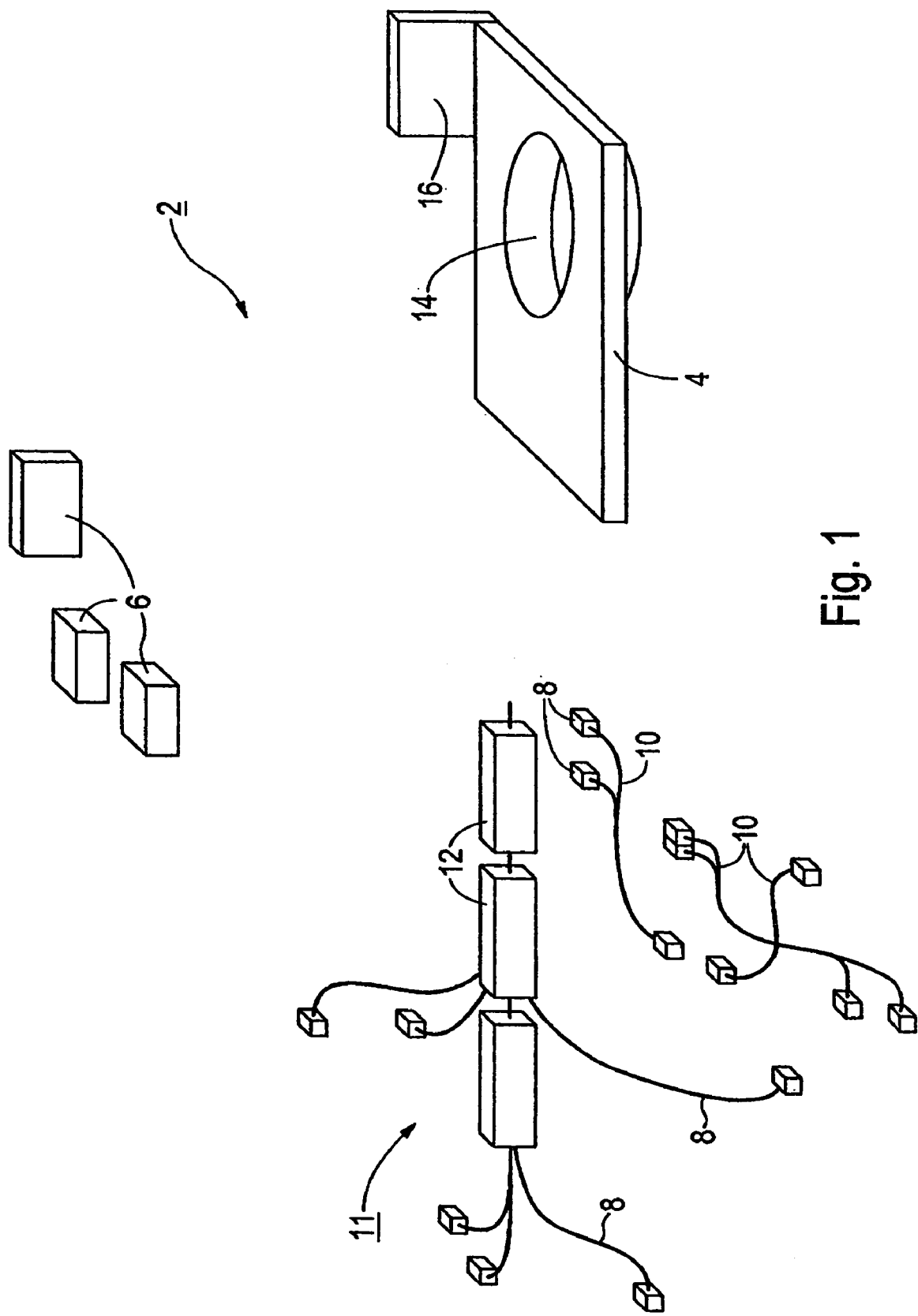

| | | | | |
|---|---|---|---|---|
| 4,882,842 A | * | 11/1989 | Basson et al. | 29/857 |
| 4,942,499 A | * | 7/1990 | Shibata et al. | 361/826 |
| 5,032,737 A | * | 7/1991 | Holm et al. | 307/9.1 |
| 5,371,942 A | * | 12/1994 | Gold et al. | 29/783 |
| 5,711,675 A | | 1/1998 | Nishitani et al. | |
| 5,735,041 A | * | 4/1998 | Zaguskin et al. | 29/857 |
| 6,173,622 B1 | * | 1/2001 | Carnevale et al. | 74/335 |

FOREIGN PATENT DOCUMENTS

| | | |
|---|---|---|
| DE | 38 43 673 A1 | 12/1988 |
| DE | 100 50 322 A1 | 10/2000 |
| DE | 100 55 471 A1 | 11/2000 |
| EP | 0 507 225 A1 | 3/1992 |

* cited by examiner

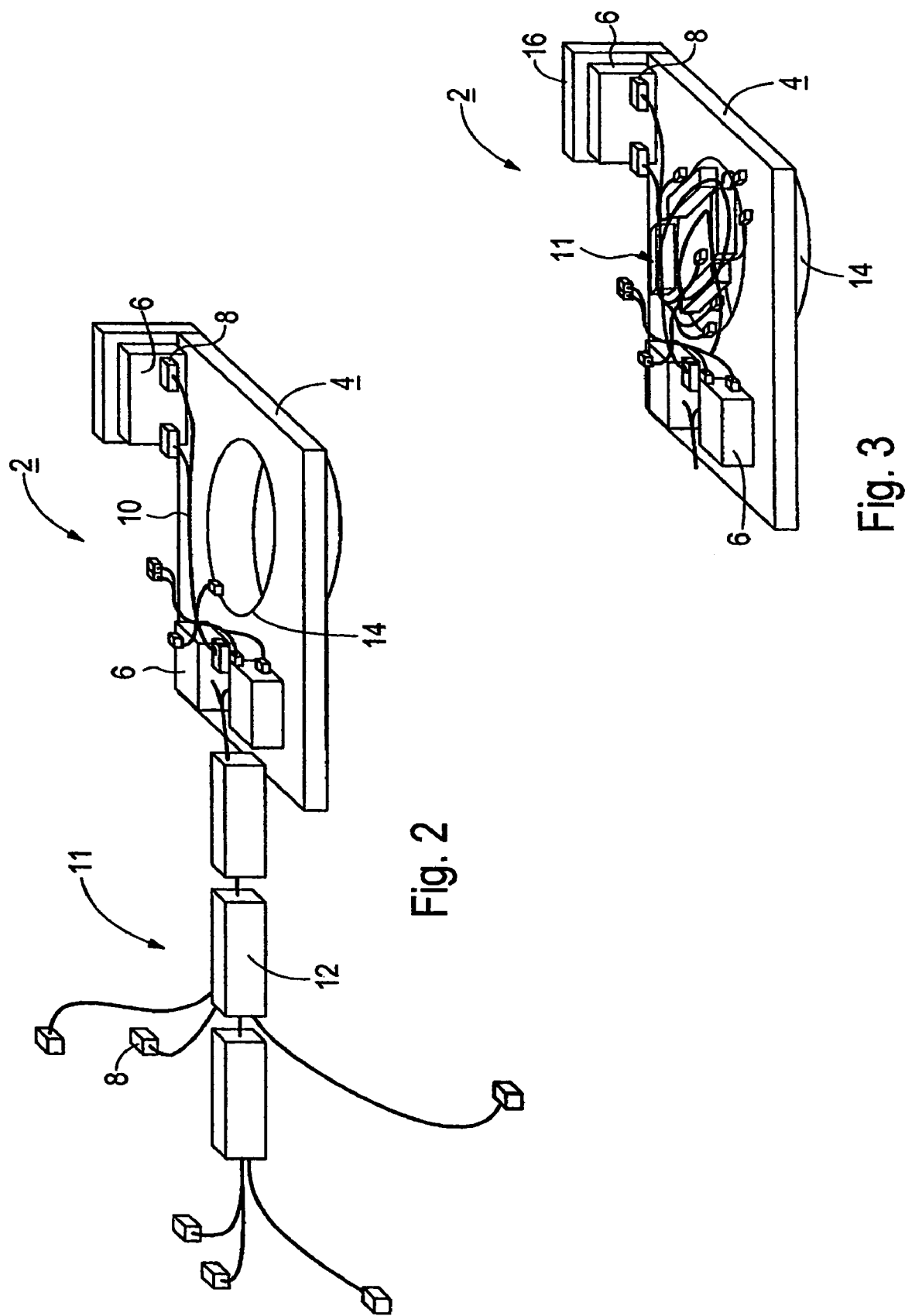

MOUNTING COMPONENT FOR A MOTOR VEHICLE AND METHOD FOR INSTALLING A VEHICLE ELECTRICAL SYSTEM FOR A MOTOR VEHICLE

The invention relates to a mounting component for a motor vehicle, including a module rack, on which components of a vehicle electrical system have been mounted beforehand, and that is intended for installation in the motor vehicle together with the previously mounted components. The invention further relates to a method for installing a vehicle electrical system for a motor vehicle.

Due to the growing number of electrical and electronic components in the motor vehicle sector, and particularly in the car industry, vehicle electrical systems are becoming increasingly complex. As the range of requirements the vehicle electrical system must satisfy grows broader, particularly as more and more equipment variations are offered, each of which requires an individually tuned vehicle electrical system, the systems and their installation in the vehicle have both become more delicate, usually involving considerable manual work.

To enable final assembly of the vehicle to proceed as rapidly and as flexibly as possible, system suppliers tend to deliver prefabricated system units to the installation site, so that the completely prefabricated unit may be installed with as few manual operations as possible. This trend is particularly notable in the field of vehicle electrical systems. For example, German patent application DE 100 55 471 A1 particularly describes an assembly rack in the form of a film, on which components of a vehicle electrical system have already been mounted. The mounting rack in the form of a film may be installed as such in the vehicle directly as a single component. It is particularly provided that this film with the components arranged thereon constitutes a so-called door module of the vehicle electrical system, which may be used to mechanically separate the wet and dry areas of the door at the same time due to the use of the film. This door module may be transported in this form from a pre-assembly site to a final assembly site for the vehicle.

Despite the use of such vehicle electrical system modules, considerable effort is still required to install the system in the vehicle.

The object of the present invention is to enable easy installation of a motor vehicle electrical system.

This object is solved according to the present invention with the features of claim 1. According to this, a mounting component is provided, including a module rack on which components of the vehicle electrical system have been installed beforehand, and which is designed to be fitted in the vehicle together with the pre-installed components. An additional vehicle electrical system module is connected thereto via prior installation besides the components that are pre-installed on the module rack, and protrudes spatially over the module rack. The module rack here serves as a transportation base for the pre-installed components and for the additional vehicle electrical system module at the same time.

An important consideration is the pre-installing of the additional vehicle electrical system module that it is not directly spatially adjacent the module rack. When installed in the vehicle, the additional vehicle electrical system module is therefore not mounted directly on the module rack, but is instead only connected to the components arranged thereon. The additional module of the vehicle electrical system thus extends beyond the limit of the module rack both spatially and electrically. This configuration has the decisive advantage that more distant electrical system subassemblies, so called electrical system modules, may also be pre-mounted, and may be installed before they reach the finally assembly location. Particularly in the interior of a motor vehicle, installation of electrical system subassemblies still requires delicate installation work, particularly in the case of a so-called interior module. Thus for example, at the moment individual control components, individual wiring harnesses and similar must be connected for the interior at the final assembly stage, which is highly labor-intensive.

With the configuration according to the invention, these additional, labor-intensive operations may be dispensed with at final assembly, since the additional module for the electrical system together with the module rack and the components arranged thereon are supplied as a single transportation and installation unit. The design of the module rack as a transportation base then also ensures that no additional transportation means are necessary. The transportation base preferably has sufficient inherent rigidity and is for example a dimensionally stable plastic component. As a result, a separate base for the mounting component with the electrical system components is not required. In turn, all the separate transportation containers or bases may be dispensed with, which considerably simplifies logistics, since these conventional transportation containers previously had to be transported between the pre-assembly and the final assembly locations. Moreover, warehousing at the final assembly location is also reduced, since now significantly fewer individual components and assemblies for the vehicle electrical system have to be kept in the current inventory. It is expedient if the transportation base also serves at the same time as a packing element or at least as part of a packing element. The transportation base thus also serves as packing for transporting the components, for the additional electrical system module, or also for other items that must be transported from the pre-assembly site to the final assembly site.

The greater degree of pre-installation due to the attachment of the additional electrical system module to the module rack also serves to simplify the final assembly in qualitative terms. There are considerable differences in vehicle electrical systems even for the same vehicle model, due to the wide range of equipment variants. In this context, extreme care must be exercised when installing an electrical system, if only with a view to safety considerations. As a result of the greater degree of pre-installation, a larger proportion of the vehicle electrical system is installed directly by the highly specialized system supplier, which means that fewer errors are apt to occur on the final assembly line. The transportation base preferably includes an identification element, for example a label or barcode, as an additional quality assurance measure. For example, the barcode may be read automatically at final assembly to verify that the correct mounting component is being installed in the vehicle.

In a preferred embodiment, the module rack is at least a part of a car trunk floor, and particularly includes a recess for a spare wheel. This design is based on the consideration that the trunk area, which has not previously been used as a module component for the vehicle electrical system is particularly suitable for combining the arrangement of electrical system components with an additional electrical system module, which extends beyond the limit of the trunk floor. If the components, for example controllers, are arranged on the module rack, they no longer need to be secured to the car body, with the associated considerable manual effort, as has been the case until now. This usually requires the use of retaining fins or other retaining devices, which can now be dispensed with. With the higher degree of pre-installation with the corresponding prior emplacement and contacting, individual emplacement and contacting at final assembly is no longer required. A further advantage may be seen in the improvement in work sequences from the point of view of ergonomics, since when they are attached directly to the car body, certain components must be fitted in installation sites that are very difficult to reach.

If the trunk floor includes a spare wheel recess, this recess is preferably used to accommodate the additional electrical system module during transportation from the pre-assembly site to the final assembly site. A trunk floor of such kind is therefore particularly suitable as a transportation base.

The additional electrical system module is expediently an interior module provided with interfaces with the electrical components arranged in the interior of a motor vehicle. The interfaces are particularly plugged connections and other connections with an interior lighting system that is installed in the roof lining, with a belt tensioning system, with an electronic seat adjustment system etc. The interior module is then particularly a main wiring harness for such electrical or electronic components arranged in the vehicle interior. The individual control units for these components may then be arranged on the module rack, with the result that at final assembly, it is only necessary to attach the plugged connections between the interior module and the individual interior components in order to assure the full functional capability of these components.

The module rack is preferably furnished with at least one retractable strap on the periphery thereof, with which a component of the vehicle electrical system is integrated. This arrangement enables the module rack to be adapted to special installation constraints that are contingent on the shape of the car body, and facilitates installation. At the same time, installation spaces defined by the special shape of the car body, for example in the area of the rear wheel arches, may thus be used to best advantage for electrical or also mechanical components. In order to render installation easier, the strap is particularly realized as a retractable strap.

In order to provide for easy mounting of the vehicle electrical system at the pre-assembly stage, the module rack is appropriately furnished with at least one molded conformation, in or along which at least part of the electrical system is arranged. This conformation is for example a channel-like recess, which forms a wiring channel or also a raised area or shoulder on the module rack.

According to an advantageous refinement, the module rack is equipped with one or more pockets or pocket-like seats, in which electronic components, particularly control units or similar, are arranged. In this case, the electronic components do not have their own housing, they are thus incorporated in the module rack without a housing. This arrangement without a housing means that the standard device housings are no longer used, which results in reduced weight and costs. The electronic components are advantageously insulated in suitable manner inside the module rack, for example mounted in a manner impermeable to dust and/or moisture.

The module rack is advantageously unaffected by the respective equipment provided specifically for a given vehicle. This is generally assured in the case of the trunk floor for example, since the trunk floor is constructed as a standard plastic formed part for all equipment variants of a given vehicle. As a result, standard installation and transportation bases may be used in each case, which facilitates not only pre-installation, but also transportation, which is preferably performed by machine.

The object is further solved according to the invention by a method for installing a vehicle electrical system, in which components of the electrical system are first arranged on a module rack, and are connected to an additional electrical system module that extends spatially beyond the boundary of the module rack. The module rack is then transported together with the components arranged thereon and the additional module part from a pre-assembly location to a final assembly location, during which time the module rack serves as a transportation base. At the final assembly location, the module rack together with the components arranged thereon and the additional electrical system module is installed in the vehicle.

The advantages described with reference to the mounting component also apply for the method, and the preferred configurations described with reference to the mounting component may also be transferred to the method in similar manner.

Figure 4:
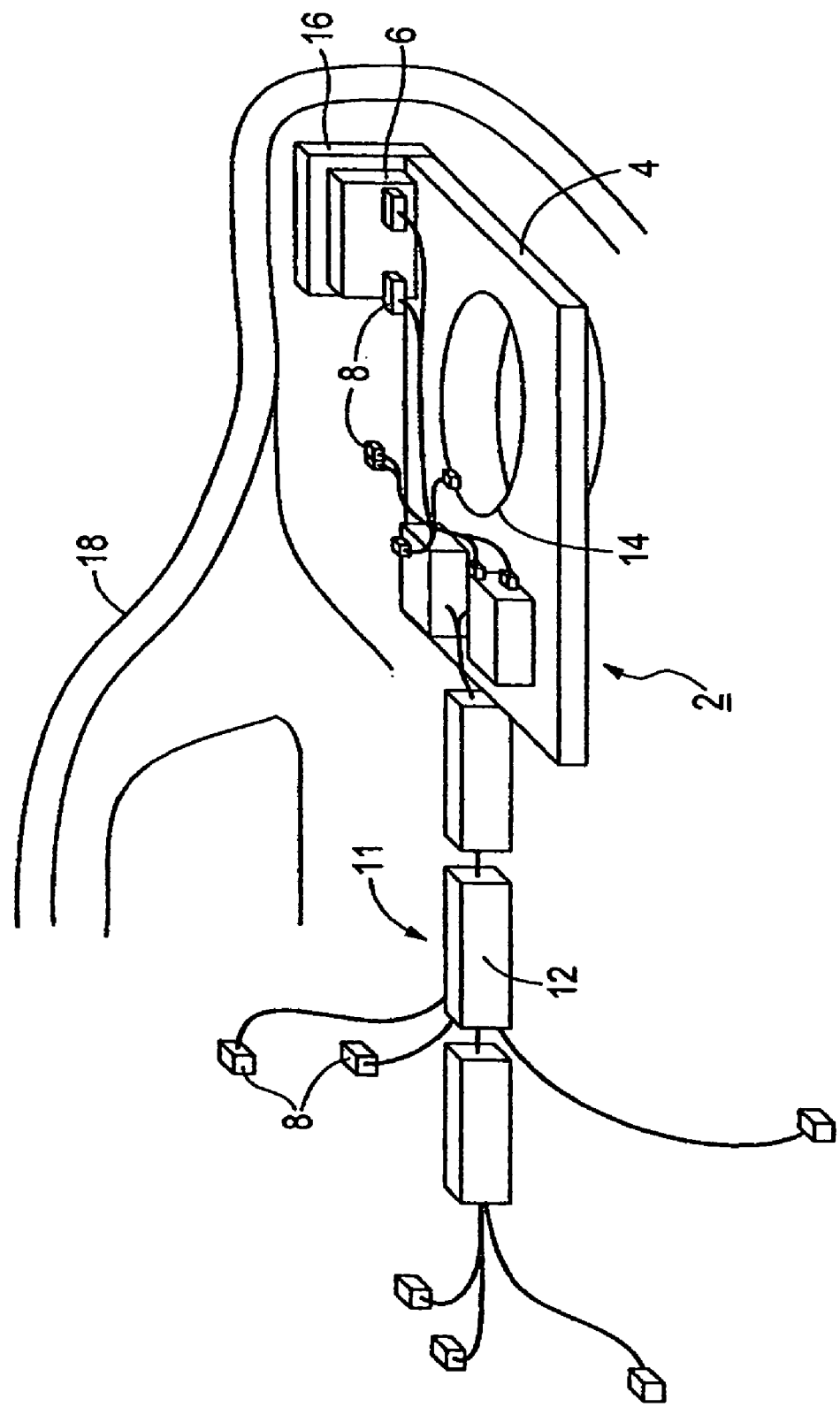

In the following, an embodiment of the invention will be explained in greater detail with reference to the drawing. In the drawing, schematically in each case, FIG. 1 shows the individual components of the mounting component before pre-installation, FIG. 2 shows the pre-installed mounting component, FIG. 3 shows the mounting component provided for transportation and FIG. 4 shows the mounting component in the mounted condition in the vehicle.

In the figures, equivalent components are designated by the same numbers in each case.

As shown in FIG. 1, a mounting component 2 for a motor vehicle, particularly a car, includes a module rack 4, electrical/electronic components 6, for example control units, and wiring harnesses 10 that have been fitted beforehand with plugs 8. The mounting component 2 further includes an interior module 11 of the vehicle electrical system, which is realized essentially by a previously assembled wiring loom with plugs 8 attached to the individual wires, the individual wires running for partial segments in wiring guides 12.

The module rack 4 is a section of a trunk floor and is conformed as an inherently rigid, dimensionally stable plastic part. The module rack 4 has a recess 14 for a spare wheel and a strap 16 on its periphery, which is retractable. Because of its dimensionally stable construction, the module rack 4 is suitable for use as a transportation base for the components 6 and the wiring harnesses 10. In this case, the module rack 4 is particularly configured so that it may be positioned for example in corresponding high rack positions without additional support, and so that it may be lifted, transported and deposited again by machinery, for example by a robotic arm.

Mechanical components, for example fixtures, may also be provided in addition to the electrical/electronic components 6.

The individual parts are installed at the premises of the system supplier for vehicle electrical systems and form the mounting component 2, as is represented in FIGS. 2 and 3. During pre-installation, the components 6 are attached securely to the module rack 4. For this purpose they may be glued, for example, or secured with clips or other affixing means. Then, the components 6 are electrically connected to each other via the wiring harnesses 10 provided for that purpose. Assembly of the module rack 4 with the individual components 6 is preferably carried out automatically. If they are assembled by hand, it is possible to perform the assembly under conditions that are ergonomically more favorable than assembly during final assembly of the vehicle on the assembly line.

In the embodiment, the components 6 are arranged on the upper side of the module rack 4 and on the inside of the retractable strap 16. The module rack 4 is preferably furnished with wiring guide channels (not shown here) and/or pockets. The latter are designed to accommodate control elements, for example printed circuit boards, and are conformed accordingly. At the same time, these control elements are embedded in the pockets such that they are protected from external influences, particularly in a manner impermeable to dust and/or moisture. The pockets then form a mechanical protection and thus also replace the control device housing that is usually essential.

The interior module 11 is connected to the components arranged on the module rack 4, the components 6 and the wiring harnesses 10, but otherwise has no mechanical connection with the module rack 4.

After the mounting component 2 has been pre-assembled, it is prepared for transportation or storage. For this purpose, the interior module 11 is placed on top of the module rack 4, in particular the interior module 11 is rolled up and placed in the spare wheel recess 14. This mounting component 2 which has been prepared for transportation, as shown in FIG. 3, may be directly stored, transported and manipulated by machines in that state without additional assisting or support means.

During final installation of the mounting component 2 in a vehicle 18, of which only the trunk area is shown, in highly schematic form, in FIG. 4, the mounting component 2 is brought into the installation position intended for the module rack 4, preferably by machine, and there is glued, or screwed for example, or otherwise affixed to the car body. The interior module 11 is then removed from the spare wheel recess and moved to the location in the vehicle provided therefor. This location is particularly the central area of the vehicle as far as the center console between the front seats. The individual plugs 8 of the interior module 11 form the interface between the interior module 11 and the electrical installations provided in the interior of the vehicle (not shown here), such as the seatbelt pretensioner or the seats, if such seats are heatable or may be adjusted via an electric motor. The components 6 that are arranged on the module rack 4 preferably perform controlling functions for these electrical components arranged in the vehicle interior.

The mounting component 2 thus represents considerable simplification of the assembly process compared with the prior method, according to which the components 6 were not secured to the car body and connected with the additional interior module 11 until the final assembly. It should be noted in particular that the interior module 11 extends beyond the dimension of the module rack 4, i.e. beyond the modular limit thereof. The interior module 11 constitutes an independent module unit of the vehicle electrical system outside the spatial boundary of the module rack, and not merely a pigtail with attached connector, such as is normally provided for example in a vehicle electrical system door module, in order to connect the door module to the rest of the electrical system. It is also important to note that the module rack 4 represents a transportation base at the same time, for the interior module 11 as well, thereby further facilitating simultaneous handling of both during final assembly.

The invention claimed is:

1. A mounting component to be installed in a motor vehicle, including a module rack securely mounted with components of a vehicle electrical system, and at least one additional module of the vehicle electrical system electrically connected to said components,
   wherein said at least one additional module has a dimension that extends beyond dimensions of the module rack and is rolled up into at least one loop and placed in a recess embedded in the module rack.

2. The mounting component in accordance with claim 1, wherein the module rack is at least a part of a trunk area and includes the recess which is a spare wheel recess.

3. The mounting component in accordance with claim 1, wherein the additional module is an interior module furnished with an interface to said at least one other electrical component arranged in the interior of the motor vehicle.

4. The mounting component in accordance with claim 3, wherein the module rack is furnished with at least one retractable strap on a periphery thereof, on which one of the components of the vehicle electrical system is secured thereonto.

5. The mounting component in accordance with claim 1, wherein the additional module is an interior module furnished with interfaces to electrical components arranged in the interior of the motor vehicle.

6. The mounting component in accordance with claim 5, wherein the module rack is furnished with at least one retractable strap on a periphery thereof, on which one of the components of the vehicle electrical system is secured thereonto.

7. A method for installing a motor vehicle electrical system into a motor vehicle, comprising:
   securing components of the vehicle electrical system onto a module rack at a pre-assembly location;
   electrically connecting the components secured onto the mount rack with an additional electrical system module with one dimension that extends beyond dimensions of the module rack;
   rolling up the electrical system module into at least one loop at the pre-assembly location after the connecting step;
   placing the rolled-up electrical system module into a recess embedded in the module rack at the pre-assembly location;
   transporting the module rack together with the components secured thereon and the rolled-up and placed electrical system module from the pre-assembly location to a final assembly location thereby using the module rack as a transportation base; and
   installing at the final assembly location the module rack in the motor vehicle together with the components secured thereon and the rolled-up and placed electrical system module.

8. The method according to claim 7, wherein the module rack is at least a part of a trunk area and includes the recess which is a spare wheel recess.

9. The method according to claim 7, wherein the electrical system module is an interior module furnished with an interface to said at least one other electrical component arranged in the interior of the motor vehicle.

10. The method according to claim 9, wherein the module rack is furnished with at least one retractable strap on a periphery thereof, on which one of the components of the vehicle electrical system is secured thereonto in the securing step.

11. The method according to claim 7, wherein the electrical system module is an interior module furnished with interfaces to electrical components arranged in the interior of the motor vehicle.

12. The method according to claim 7, wherein the module rack is furnished with at least one retractable strap on a periphery thereof, on which one of the components of the vehicle electrical system is secured thereonto in the securing step.

13. The method according to claim 7, further comprising: moving the electrical system module out of the recess at the final assembly location while maintaining the electrical system module being connected with the components secured onto the mount rack.

14. The method according to claim 13, further comprising: un-rolling at the final assembly location the electrical system module to extend beyond the dimensions of the module rack while maintaining the electrical system module being connected with the components secured onto the mount rack, thereby connecting the electrical system module to at least one other electrical component of the motor vehicle.

* * * * *